United States Patent
Li et al.

(10) Patent No.: US 10,663,744 B2
(45) Date of Patent: May 26, 2020

(54) OPTICAL PROJECTOR DEVICE

(71) Applicants: TRIPLE WIN TECHNOLOGY(SHENZHEN) CO.LTD., Shenzhen (CN); HON HAI PRECISION INDUSTRY CO., LTD., New Taipei (TW)

(72) Inventors: Jing-Wei Li, Guangdong (CN); Shin-Wen Chen, New Taipei (TW); Sheng-Jie Ding, Guangdong (CN); Jian-Chao Song, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 115 days.

(21) Appl. No.: 16/019,710

(22) Filed: Jun. 27, 2018

(65) Prior Publication Data
US 2019/0317333 A1   Oct. 17, 2019

(30) Foreign Application Priority Data

Apr. 12, 2018   (CN) .......................... 2018 1 0327726

(51) Int. Cl.
| | |
|---|---|
| *G02B 26/00* | (2006.01) |
| *G02B 27/18* | (2006.01) |
| *G02B 27/09* | (2006.01) |
| *G02B 27/30* | (2006.01) |

(52) U.S. Cl.
CPC ......... *G02B 27/18* (2013.01); *G02B 27/0916* (2013.01); *G02B 27/0944* (2013.01); *G02B 27/0988* (2013.01); *G02B 27/30* (2013.01)

(58) Field of Classification Search
CPC .................................................. G02B 27/18
USPC .......................................................... 359/237
See application file for complete search history.

(56) References Cited

U.S. PATENT DOCUMENTS

| | | | |
|---|---|---|---|
| 2009/0057413 A1* | 3/2009 | Vinogradov | ........... G02B 27/20 235/462.35 |
| 2009/0135297 A1 | 5/2009 | Wu et al. | |
| 2017/0029596 A1 | 2/2017 | Kim et al. | |
| 2017/0111557 A1 | 4/2017 | Ko et al. | |

FOREIGN PATENT DOCUMENTS

WO      2017022187 A1   2/2017

* cited by examiner

*Primary Examiner* — James C. Jones
(74) *Attorney, Agent, or Firm* — ScienBiziP, P.C.

(57) ABSTRACT

A optical projector device less vulnerable to deformation of projected light by generated heat includes a printed circuit board, a light source, and an optical module. The heat-generating light source emits a laser beam, the optical module being mounted on the printed circuit board and surrounding the light source. The optical module comprises a lens holder, a collimating optical element received in the lens holder, and a diffractive optical element away from the light source. The lens holder comprises an outer lens holder and an inner lens holder fixed in the outer lens holder, and the diffractive optical element is received in the inner lens holder, this arrangement enables the dissipation of any heat-expansion force away from these elements.

15 Claims, 6 Drawing Sheets though the term modifies, such that the component need not be exact. For example, "substantially cylindrical" means that the object resembles a cylinder, but can have one or

OPTICAL PROJECTOR DEVICE

FIELD

The subject matter herein generally relates to optical projection.

BACKGROUND

Optical projector module comprises a light source to emit laser beam and a collimating lens disposed in a light path of the light source to collimate the laser beam. However, heat is generated during the light source working, and the heat leads to the collimating lens deforming, the light path generated by the optical projector module is accordingly deformed.

BRIEF DESCRIPTION OF THE DRAWINGS

Implementations of the present technology will now be described, by way of example only, with reference to the attached figures.

DETAILED DESCRIPTION

Figure 1:
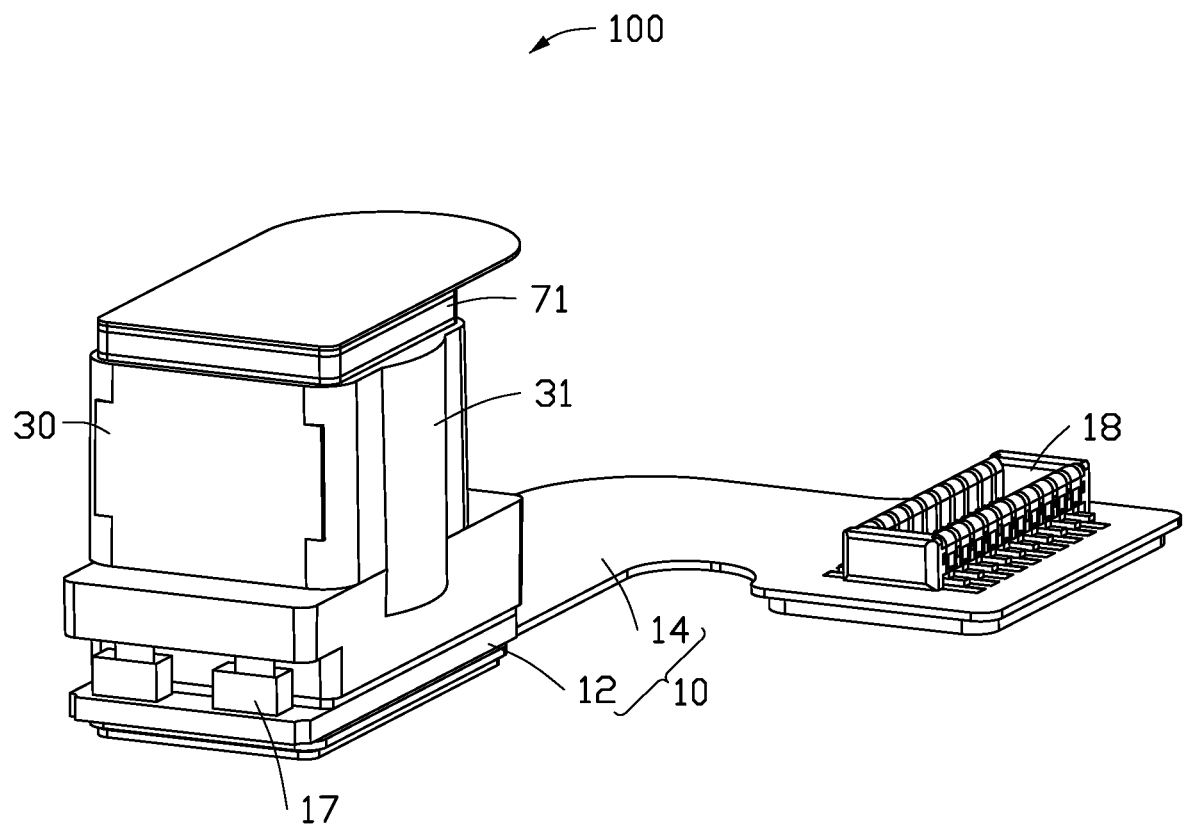
FIG. 1 is an isometric view of a optical projector device comprising an optical module in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more debytions from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates an optical projector device 100 according to one embodiment. The optical projector device 100 includes a printed circuit board 10, a light source 20, and an optical module 30 mounted on the printed circuit board 10.

Figure 2:
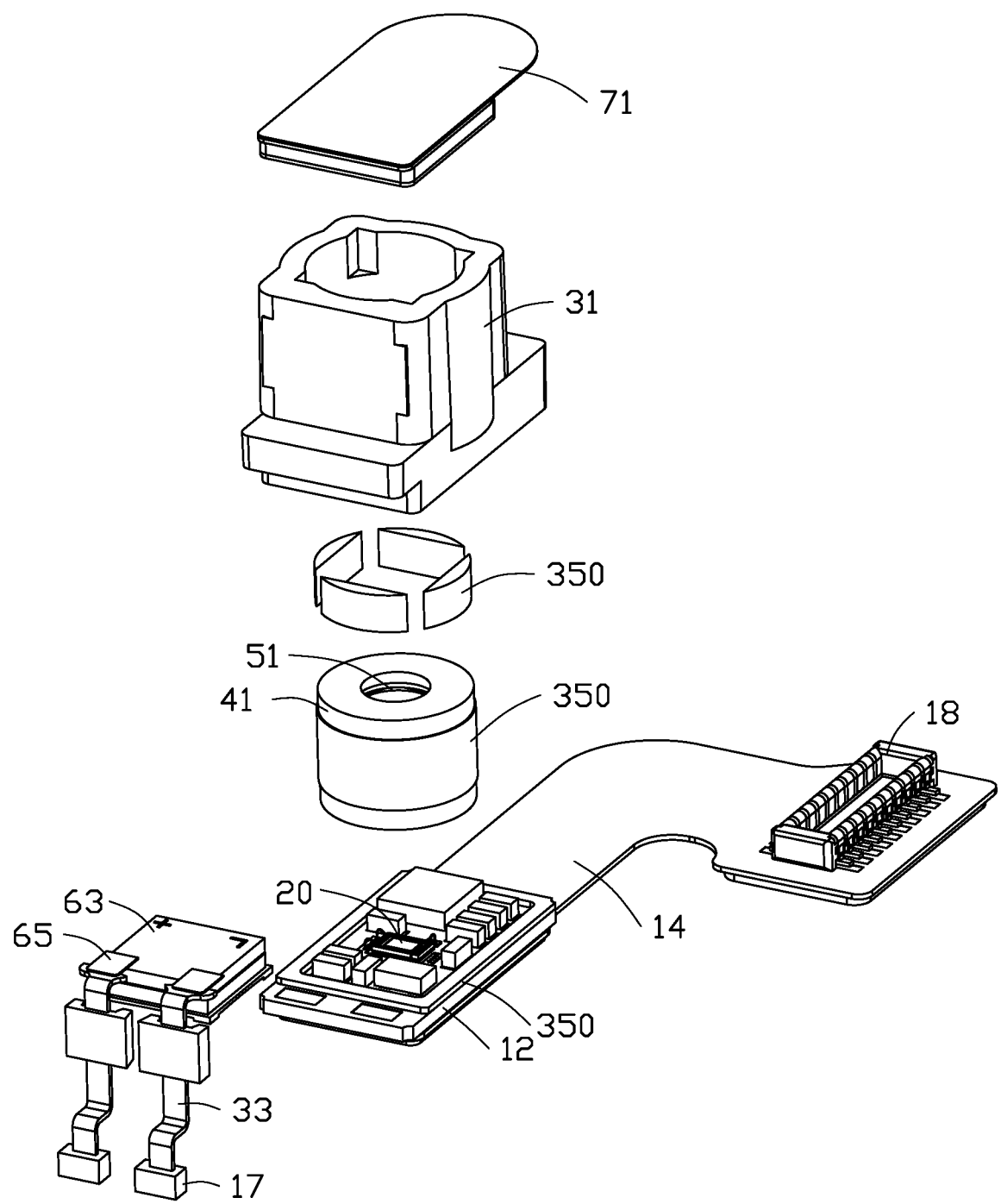
FIG. 2 is an exploded isometric view of the optical projector device in FIG. 1.
Figure 3:
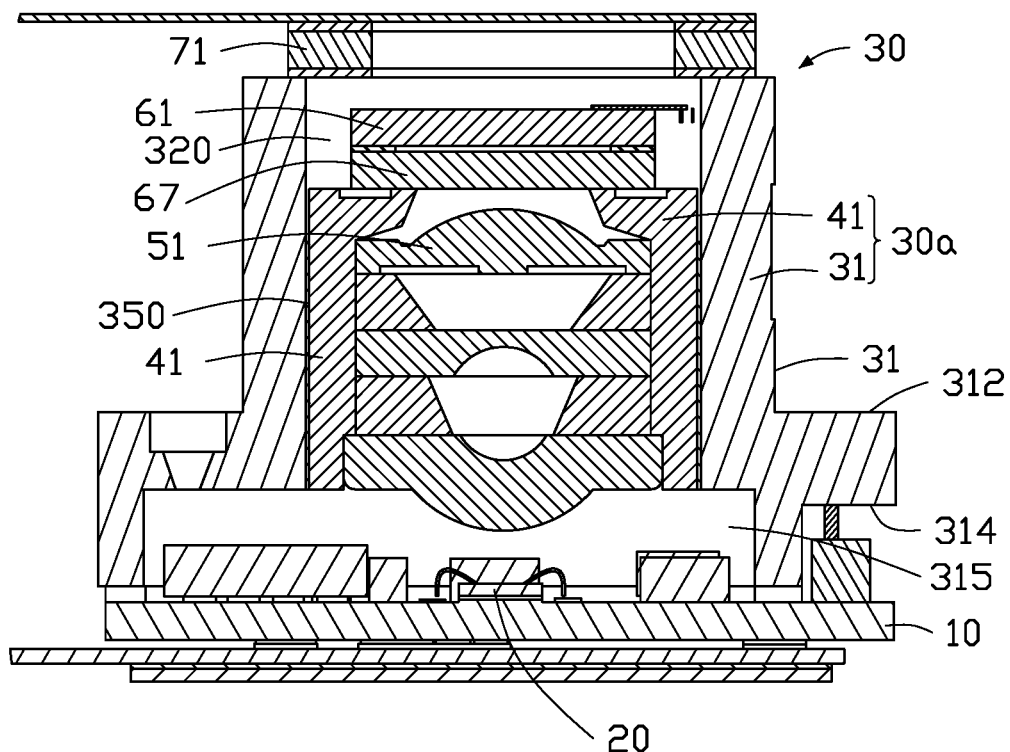
FIG. 3 is a cross-section view of the optical projector device in FIG. 1.
Figure 4:
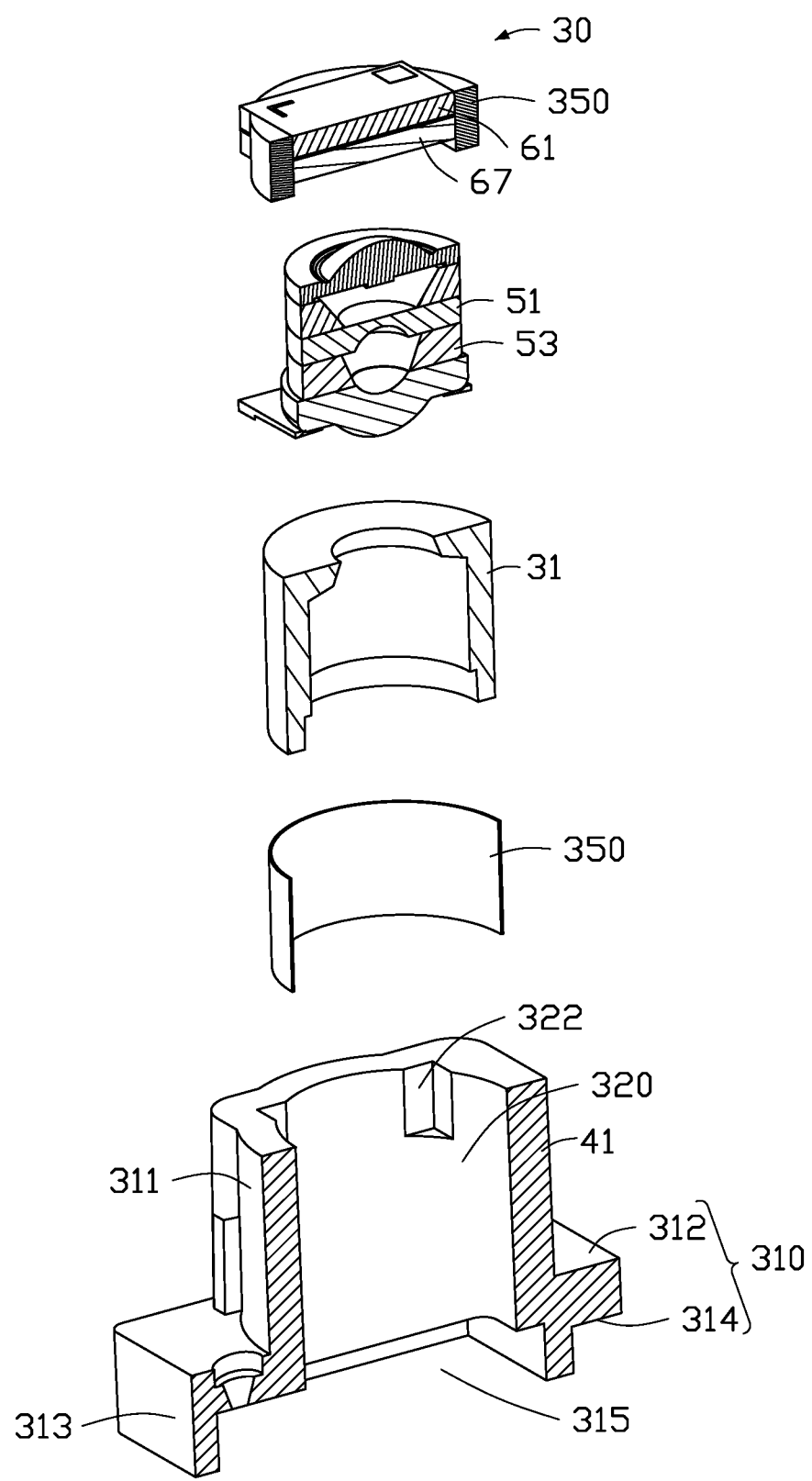
FIG. 4 is an exploded isometric view of optical module in accordance with another embodiment.
Figure 5:
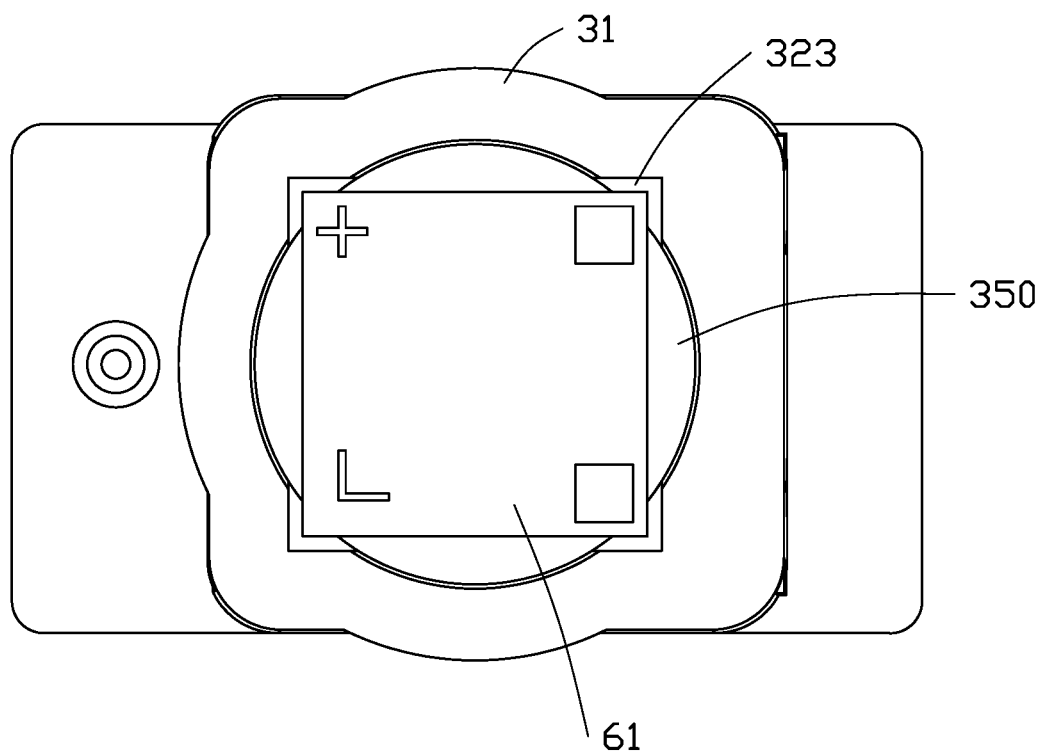
FIG. 5 is a top view of the optical projector device in FIG. 4.
Figure 6:
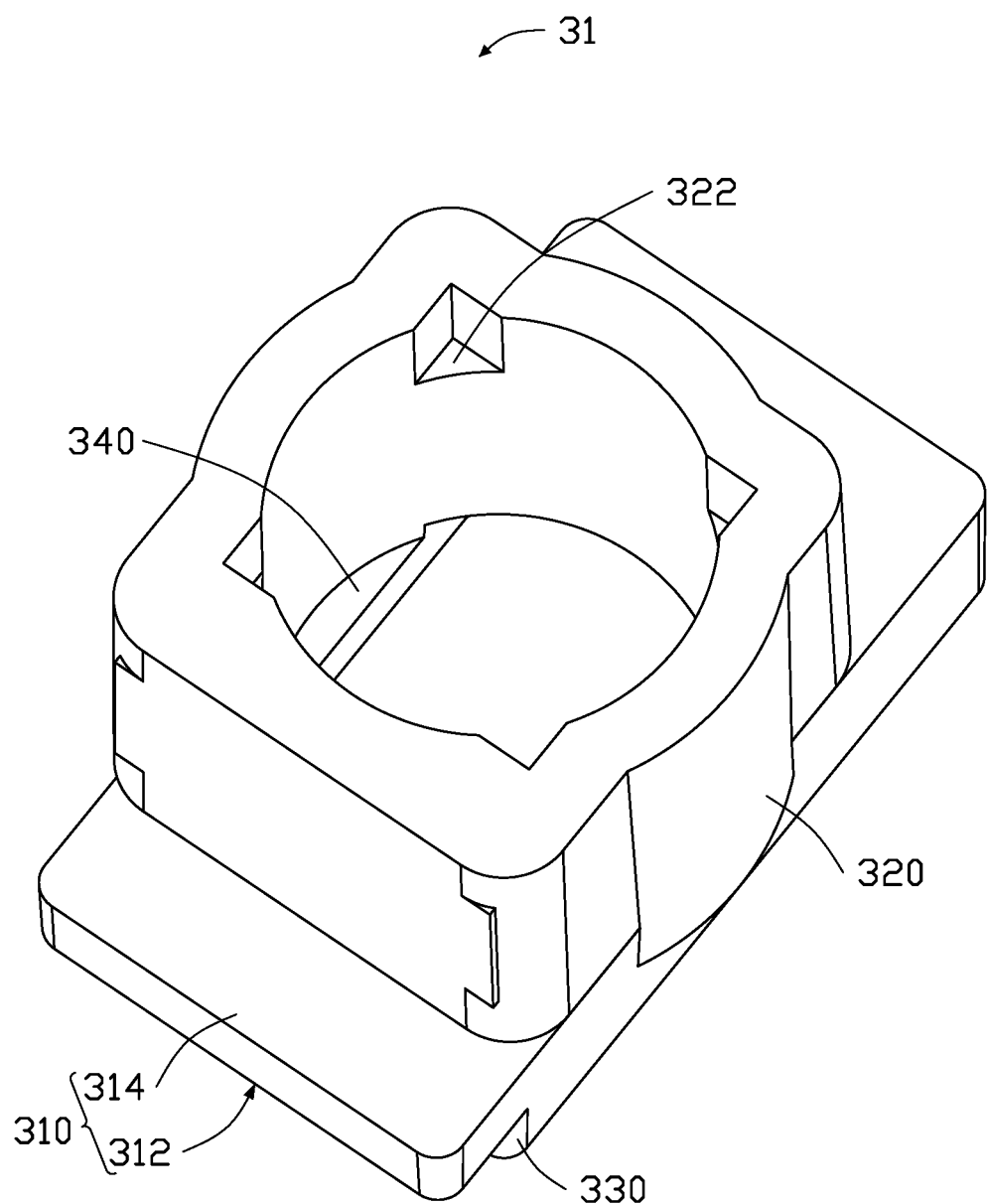
FIG. 6 is an exploded isometric view of an outer lens holder in the device of FIG. 4.

The printed circuit board 10 can be a flexible circuit board or a rigid-flexible board. The printed circuit board 10 includes a main portion 12 and an extending portion 14 connecting with the main portion 12, as shown in FIG. 2. The main portion 12 is configured to bear the optical member 30. An external connector 16 is mounted to the extending portion 14.

The light source 20 is mounted on a central area of the main portion 12 and electrically connected to the main portion 12. The light source 20 is a vertical cavity surface emitting laser (VCSEL) chip. The printed circuit board 10 further includes a controller device and a plurality of components 18 mounted around the light source 20. The components 18 include resistors, capacitors, and inductors.

The optical module 30 is configured to receive laser beam emitted from the light source 20. The optical module 30 includes a lens holder 30a, a collimating optical element 51 being received in the lens holder 30a, a diffractive optical element (DOE) 61, a conducting film 63, and a protecting cover 71 disposed on the top end of the optical module 30. When the optical projector device 100 is to function as a 3D imaging device, the protecting cover 71 is removed.

In the illustrated embodiment, the lens holder 30a includes an outer lens holder 31 and an inner lens holder 41. The outer lens holder 31 is adhesively (with adhesive 350) mounted on the main portion 12 and surrounds the light source 20. In other embodiment, the outer lens holder 31 can also be secured on the printed circuit board 10. The outer lens holder 31 includes a flat plate 310, a first side wall 311 and a second side wall 313. The flat plate 310 includes a top surface 312 and a bottom surface 314 opposite to the top surface 312. The first side wall 311 protrudes from side edges of the top surface 312, the second side wall 313 protrudes from side edges of the bottom surface 314. The first side wall 311 and the flat plate 310 together form a receiving portion 320. The second side wall 313 and the flat plate 310 together form a receiving space 315, the light source 20 is located inside the receiving space 315.

The outer lens holder 31 further defines a number of cutouts 322 at top end of the inner surface, the cutouts 322 are configured to bear the diffractive optical element 61. In the illustrated embodiment, the number of cutouts 322 is four and these are uniformly distributed at the inner surface. Each cutout 322 includes an angle 323, and the angle 323 is 90 degrees. Extending direction of the cutouts 322 is parallel to a central axis of the outer lens holder 31.

The outer lens holder 31 includes a conducting wire 33. The conducting wire 33 is buried in the side wall of the outer lens holder 31, opposite ends of the conducting wire 33 are exposed at opposite ends of the outer lens module 31. One end of the conducting wire 33 is connected a first conducting pad 17, a second conducting pad 65 is connected to the other end of wire 33. The conducting wire 33 is electrically connected to the printed circuit board 10 via the first conducting pad 17. That is, the first conducting pad 17 can be mounted on the printed circuit board 10 or located at one end of the conducting wire 33. FIG. 2 shows a detailed structure, the conductor 33 being removed from the outer lens holder 31. The conducting wire 33 is formed on the side wall of the outer lens holder 31.

The inner lens holder 41 is substantially cylindrical. A portion of the flat plate 310 is exposed from the inner surface of the receiving portion 320, to form a bearing portion 340. The inner lens holder 41 is fixed inside of the outer lens holder 31 and is located on the bearing portion 340. A gap is formed between outer surface of the inner lens holder 41 and inner surface of the outer lens holder 31, and an adhesive layer is located in the gap. The adhesive layer fixes the inner lens holder 41 and the outer lens holder 31 in their places. In this illustrated embodiment, the inner lens holder 41 is fixed inside the outer lens holder 31 using adhesive 350. Thermal expansion coefficient of the inner lens holder 41 is smaller than thermal expansion coefficient of the outer lens holder 31, this reduces thermal deformation of the inner lens holder 41. The position and optical or geometric correctness of collimating optical element 51 are thus less vulnerable to the effects of heat.

The collimating optical element 51 is located inside the inner lens holder 41. The number of collimating optical elements 51 can be two or more. In the illustrated embodiment, the number of collimating optical elements 51 is three, a spacing ring 53 is between adjacent collimating optical elements 51.

The diffractive optical element 61 is substantially square, and four angles of the diffractive optical element 61 are disposed in the cutouts 322 and fixed in the cutouts 322 using adhesive 350.

The conducting film 63 is formed on a surface of the diffractive optical element 61 away from the light source 20. The conducting film 63 is electrically connected to the printed circuit board 10 via the second connecting pad 65 and the conducting wire 33. The conducting film 63 is made of indium tin oxide (ITO) and can be formed on the diffractive optical element 61 via an electroplating method. The conducting film 63 can detect optical power of the laser beam emitted from the light source 20.

The optical module 30 further comprises a filter 67 disposed between the collimating optical element 51 and the diffractive optical element 61. The filter 67 is configured to filter out stray light in the infrared beam emitted from the light source 20.

The optical projector device 100 can be used for face recognition. When the conductive film 63 detects the laser power, the reading is transmitted to the circuit board 10. The controlling device on the circuit board determines whether the power is in a predetermined range, and can adjust the power of the laser beam emitted by the light source 20. Harm to human eye by excessive laser power during face recognition is thus prevented.

The lens holder 30a is detached to the inner lens holder 41 and the outer lens holder 31, and the inner lens holder 41 is fixed in the outer lens holder 31. When the light source 20 is working, heat is generated by the light source 20. Such heat arrives first at the outer lens holder 31, and heat conduction is reduced or cushioned by the gap between the inner lens holder 41 and the outer lens holder 31. Any extrusion force is distributed through the uniform wall of the inner lens holder 41, and the generated force transmitted to the collimating optical elements 51 is small, thus the collimating optical elements 51 are not moved or displaced. The structure and quality of the light produced by the optical projection device 100 thus remains largely unaffected.

A working principle of the optical projector device 100 is usually as a 3D imaging device 200. The light source 20 emits a laser beam. Wavelength of the light in the laser beam is in a range from 830 nm to 940 nm, especially 940 nm. The collimating optical element 51 collimates the laser beam, the diffraction optical element 61 is disposed at one side of the collimating optical element 51 away from the light source 20 and diffracts the collimated beam into a laser beam having a certain divergence angle and of a certain pattern.

The embodiments shown and described above are only examples. Therefore, many commonly-known features and details in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical projector device comprising:
   a printed circuit board;
   a light source mounted on the printed circuit board and configured to emit laser beam; and
   an optical module mounted on the printed circuit board and surrounding the light source; wherein the optical module comprises a lens holder, a collimating optical element being received in the lens holder, and a diffractive optical element disposed at one side of the collimating optical element away from the light source; wherein the lens holder comprises an outer lens holder and an inner lens holder located inside the outer lens holder, and the diffractive optical element received in the inner lens holder.

2. The optical projector device of claim 1, wherein thermal expansion coefficient of the inner lens holder is smaller than thermal expansion coefficient of the outer lens holder.

3. The optical projector device of claim 1, wherein the printed circuit board comprises a main portion and an extending portion connecting with the main portion, the outer lens holder is mounted on the main portion.

4. The optical projector device of claim 1, wherein the light source is a vertical cavity surface emitting laser chip.

5. The optical projector device of claim 1, wherein the outer lens holder comprises a flat plate, a first side wall and a second side wall, the flat plate comprises a top surface and a bottom surface opposite to the top surface, the first side wall protrudes away from side edges of portion the top surface, the second side wall protrudes away from side edges of bottom surface; the first side wall and the flat plate together form a receiving portion, the second side wall and the flat plate together form a receiving space, and the light source locates inside the receiving space.

6. The optical projector device of claim 5, wherein the outer lens holder further defines a number of cutouts at top end of the inner surface, and the cutouts uniformly distribute at the inner surface, extending direction of the cutouts is parallel to a central axis of the outer lens holder.

7. The optical projector device of claim 6, wherein each cutout has an angle, and the angle is 90 degree.

8. The optical projector device of claim 7, wherein the diffractive optical element is substantially square, and four angles of the diffractive optical element are disposed in the cutouts.

9. The optical projector device of claim 1, wherein the outer lens holder comprises a conducting wire, the conducting wire is buried in the side wall of the outer lens holder, and the two opposite ends of the conducting wire are exposed two opposite ends of the outer lens module.

10. The optical projector device of claim 9, wherein opposite two ends of the conducting wire are connected a first conducting pad and a second conducting pad, the conducting wire is electrically connected to the printed circuit board via the first conducting pad.

11. The optical projector device of claim 10, wherein the optical module further includes a conducting film, the conducting film is formed on a surface of the diffractive optical element away from the light source, the conducting film is electrically connected to the printed circuit board via the second connecting pad and the conducting wire.

12. The optical projector device of claim 5, wherein the inner surface of the receiving portion exposes portion of the flat plate to form a bearing portion, the inner lens holder is fixed on the bearing portion.

13. The optical projector device of claim 1, wherein the optical module further comprises a filter disposed between the collimating optical element and the diffractive optical element.

14. The optical projector device of claim 1, wherein the printed circuit board is a flexible circuit board or a rigid-flexible board.

15. The optical projector device of claim 1, wherein a little gap is formed between outer surface of the inner lens holder and inner surface of the outer lens holder, and an adhesive layer is located in the litter gap and configured to fix the inner lens holder and the outer lens holder.

* * * * *